(12) United States Patent
Sengupta et al.

(10) Patent No.: US 10,952,452 B2
(45) Date of Patent: *Mar. 23, 2021

(54) DISSOLVABLE FILMS IMPREGNATED WITH ENCAPSULATED TOBACCO, TEA, COFFEE, BOTANICALS, AND FLAVORS FOR ORAL PRODUCTS

(71) Applicant: PHILIP MORRIS USA INC., Richmond, VA (US)

(72) Inventors: Tapashi Sengupta, Barrington, IL (US); Munmaya K. Mishra, Manakin Sabot, VA (US); William R. Sweeney, Richmond, VA (US)

(73) Assignee: Philip Morris USA Inc., Richmond, VA (US)

( * ) Notice: Subject to any disclaimer, the term of this patent is extended or adjusted under 35 U.S.C. 154(b) by 876 days.

This patent is subject to a terminal disclaimer.

(21) Appl. No.: 14/923,995

(22) Filed: Oct. 27, 2015

(65) Prior Publication Data

US 2016/0044943 A1 Feb. 18, 2016

Related U.S. Application Data

(63) Continuation of application No. 12/648,154, filed on Dec. 28, 2009, now Pat. No. 9,167,835.

(Continued)

(51) Int. Cl.
*A23P 10/30* (2016.01)
*A24B 13/00* (2006.01)
(Continued)

(52) U.S. Cl.
CPC .................. *A23F 3/14* (2013.01); *A23F 5/14* (2013.01); *A23L 27/79* (2016.08); *A23P 10/30* (2016.08);
(Continued)

(58) Field of Classification Search
None
See application file for complete search history.

(56) References Cited

U.S. PATENT DOCUMENTS 1,234,279 A 7/1917 Buchanan
1,376,586 A 5/1921 Schwartz
(Continued)

FOREIGN PATENT DOCUMENTS

CA 700009 A 12/1964
EP 0 510 817 A1 10/1992
(Continued)

OTHER PUBLICATIONS

Burros, Marian, "Eating Well; Cigar Cuisine Puzzles Health Experts", Jan. 31, 2001, New York Times. Accessed on 6/181/2019 via: https://www.nytimes.com/2001/01/31/dining/eating-well-cigar-cuisine-puzzles-health-experts.html (Year: 2001).*

(Continued)

*Primary Examiner* — Michael J Felton
(74) *Attorney, Agent, or Firm* — Harness, Dickey & Pierce, P.L.C.

(57) ABSTRACT

A process for preparing an orally-enjoyable film of encapsulated plant material includes combining particles of finely divided plant material, a first coating material, and a second coating material, then inducing gelation to form a gel matrix of the particles coated with the first coating material embedded in the second coating material, followed by forming a film from the gel matrix. Also disclosed is a film of coated particles of finely-divided plant material, made of a gel matrix of plant material at least partially surrounded by a first coating material and embedded in a second coating material.

20 Claims, 2 Drawing Sheets

Related U.S. Application Data

(60) Provisional application No. 61/141,557, filed on Dec. 30, 2008.

(51) Int. Cl.
  A24B 15/30    (2006.01)
  A23F 3/14     (2006.01)
  A24B 15/18    (2006.01)
  A23L 27/00    (2016.01)
  A23F 5/14     (2006.01)
  A24B 15/28    (2006.01)

(52) U.S. Cl.
  CPC ............ *A24B 13/00* (2013.01); *A24B 15/186* (2013.01); *A24B 15/285* (2013.01); *A24B 15/302* (2013.01); *A23V 2002/00* (2013.01)

(56) References Cited

U.S. PATENT DOCUMENTS

| | | | |
|---|---|---|---|
| 2,305,622 | A | 12/1942 | Kremers |
| 3,166,078 | A | 4/1961 | Parmele et al. |
| 3,111,127 | A | 11/1963 | Jarboe |
| 3,312,226 | A | 4/1967 | Bavley et al. |
| 3,435,829 | A | 4/1969 | Seligman et al. |
| 3,746,012 | A | 7/1973 | Deszyck |
| 4,018,233 | A | 4/1977 | Miyake |
| 4,034,764 | A | 7/1977 | Rainer et al. |
| 4,109,663 | A | 8/1978 | Maeda et al. |
| 4,143,666 | A | 3/1979 | Rainer et al. |
| 4,212,310 | A | 7/1980 | Van Auken et al. |
| 4,253,473 | A | 3/1981 | Marmo et al. |
| 4,276,312 | A | 6/1981 | Merritt |
| 4,446,165 | A | 5/1984 | Roberts |
| 4,506,684 | A | 3/1985 | Keritsis |
| 4,515,769 | A | 5/1985 | Merritt et al. |
| 4,789,516 | A | 12/1988 | Lim |
| 4,806,356 | A | 2/1989 | Shaw |
| 4,861,627 | A | 8/1989 | Mathiowitz et al. |
| 4,972,854 | A | 11/1990 | Kiernan et al. |
| 5,104,674 | A | 4/1992 | Chen et al. |
| 5,144,964 | A | 9/1992 | Demain |
| 5,186,185 | A | 2/1993 | Mashiko et al. |
| 5,199,450 | A | 4/1993 | Houminer et al. |
| 5,370,139 | A | 12/1994 | Shu et al. |
| 5,525,351 | A | 6/1996 | Dam |
| 5,567,462 | A | 10/1996 | Ehrlich |
| 5,692,525 | A | 12/1997 | Counts et al. |
| 5,724,998 | A | 3/1998 | Gellatly et al. |
| 5,725,865 | A | 3/1998 | Mane et al. |
| 5,752,529 | A | 5/1998 | Mane et al. |
| 5,788,991 | A | 8/1998 | Nastke et al. |
| 5,827,531 | A | 10/1998 | Morrison et al. |
| 5,962,662 | A | 10/1999 | Shu et al. |
| 6,073,062 | A | 6/2000 | Hoshino et al. |
| 6,323,306 | B1 | 11/2001 | Song et al. |
| 6,325,859 | B1 | 12/2001 | De Roos et al. |
| 6,428,624 | B1 | 8/2002 | Coleman, III et al. |
| 6,458,404 | B1 | 10/2002 | Adachi |
| 6,676,959 | B1 | 1/2004 | Andersson et al. |
| 6,703,062 | B1 | 3/2004 | Appleqvist et al. |
| 6,761,174 | B2 | 7/2004 | Jupe et al. |
| 6,845,777 | B2 | 1/2005 | Pera |
| 6,884,906 | B2 | 4/2005 | Dewis et al. |
| 7,032,601 | B2 | 4/2006 | Atchley et al. |
| 7,861,728 | B2 | 1/2011 | Holton, Jr. et al. |
| 8,034,450 | B2 | 10/2011 | Curtis et al. |
| 8,356,606 | B2 | 1/2013 | Sengupta et al. |
| 8,722,410 | B2 | 5/2014 | Samuel et al. |
| 9,167,847 | B2 | 10/2015 | Sengupta et al. |
| 9,532,592 | B2 | 1/2017 | Sengupta et al. |
| 10,568,338 | B2 | 2/2020 | Sengupta et al. |
| 2002/0193269 | A1 | 12/2002 | Anderson et al. |
| 2003/0070687 | A1 | 4/2003 | Atchley et al. |
| 2003/0107149 | A1 | 6/2003 | Yang et al. |
| 2004/0101543 | A1 | 5/2004 | Liu et al. |
| 2004/0118422 | A1 | 6/2004 | Lundin et al. |
| 2004/0120991 | A1 | 6/2004 | Gardner et al. |
| 2005/0000528 | A1 | 1/2005 | Bereman |
| 2005/0061339 | A1 | 3/2005 | Hansson et al. |
| 2005/0067726 | A1 | 3/2005 | Yan et al. |
| 2005/0089548 | A1 | 4/2005 | Virgalitto et al. |
| 2005/0172976 | A1 | 8/2005 | Newman et al. |
| 2005/0241656 | A1 | 11/2005 | Kennison |
| 2005/0244521 | A1 | 11/2005 | Strickland et al. |
| 2005/0260266 | A1 | 11/2005 | Gebreselassie et al. |
| 2006/0037623 | A1 | 2/2006 | Lawrence |
| 2006/0090769 | A1 | 5/2006 | Woodson et al. |
| 2006/0165990 | A1 | 7/2006 | Curtis et al. |
| 2006/0191548 | A1 | 8/2006 | Strickland et al. |
| 2006/0210610 | A1 | 9/2006 | Davidson et al. |
| 2007/0000505 | A1 | 1/2007 | Zhuang et al. |
| 2007/0082094 | A1* | 4/2007 | McClements ............ A23B 4/10 426/302 |
| 2007/0098779 | A1 | 5/2007 | Hanzen et al. |
| 2007/0122455 | A1 | 5/2007 | Myers et al. |
| 2007/0186941 | A1 | 8/2007 | Holton, Jr. et al. |
| 2008/0029110 | A1 | 2/2008 | Dube et al. |
| 2008/0029113 | A1 | 2/2008 | Snaidr et al. |
| 2008/0081071 | A1 | 4/2008 | Sanghvi et al. |
| 2008/0149121 | A1 | 6/2008 | Wrenn et al. |
| 2009/0014018 | A1 | 1/2009 | Sengupta et al. |
| 2009/0269421 | A1 | 10/2009 | Ooya |
| 2009/0301505 | A1 | 12/2009 | Liu et al. |
| 2013/0108741 | A1 | 5/2013 | Sengupta et al. |
| 2016/0044942 | A1 | 2/2016 | Sengupta et al. |
| 2016/0044943 | A1 | 2/2016 | Sengupta et al. |
| 2017/0251714 | A1 | 9/2017 | Mishra et al. |

FOREIGN PATENT DOCUMENTS

| | | |
|---|---|---|
| EP | 0 746 986 A2 | 12/1996 |
| EP | 1371410 A1 | 12/2003 |
| JP | 5783907 B2 | 9/2015 |
| WO | WO-00/14124 A1 | 3/2000 |
| WO | WO-03/28492 A1 | 4/2003 |
| WO | WO 2006/004480 A1 | 1/2006 |
| WO | WO-2007073188 A1 | 6/2007 |
| WO | WO-2008075945 A1 | 6/2008 |
| WO | WO 2008146176 A2 | 12/2008 |
| WO | WO-2009/098591 A2 | 8/2009 |

OTHER PUBLICATIONS

International Preliminary Report on Patentability dated Jan. 26, 2010 for PCT/IB2008/002792.

Simon et al., "Thermoanalytical Study of O,O'-Dibenzoyl-(2R, 3R)-Tartaric Acid SMC, Part IV. SMC formation in melt," *Journal of Thermal Analysis and Calorimetry*, vol. 75 (2004), pp. 787-793.

United States Office Action for corresponding U.S. Appl. No. 14/923,899, dated Mar. 8, 2019.

United States Notice Of Allowance for U.S. Appl. No. 14/923,899, dated Sep. 5, 2019.

United States Office Action for corresponding U.S. Appl. No. 14/924,225, dated Jun. 21, 2019.

Burros, Marian, "Eating Well,:Cigar Cuisine Puzzles Health Experts", Jan. 31, 2001, New York Times. Accessed on Aug. 18, 2019 via: http://www.nytimes.com/2001/01/31/dining/eating-well-cigar-cuisine-puzzles-health-experts.html (Year: 2001).

International Preliminary Report on Patentability and Written Opinion dated Apr. 11, 2012 for Application No. PCT/EP2010/006197 (7pages).

Weinbreck, Fanny, "Whey protein/gum arabic coacervates: structure and dynamics", 2004, Utrecht University (The Netherlands).

Turgeon, S.L. et al., "Protein-polysaccharide complexes and coacervates", Current Opinion in Colloid and Interface Science, London, GB, vol. 12, No. 4-5, Oct. 1, 2007, pp. 166-178.

International Search Report and Written Opinion dated Mar. 28, 2011 for Application No. PCT/EP2010/006197.

Commonly Assigned U.S. Appl. No. 12/155,227, filed May 30, 2008.

(56) References Cited

OTHER PUBLICATIONS

International Search Report and Written Opinion dated Jul. 15, 2009 for Application No. PCT/IB2008/002533.
U.S. Appl. No. 14/923,899, filed Oct. 27, 2015.
United States Office Action for U.S. Appl. No. 14/924,225, dated Dec. 26, 2019.
United States Notice of Allowance for U.S. Appl. No. 14/924,225, dated Jul. 10, 2020.
Pack Aroma Flavor Encapsulation, (1991). https://www.industrydocuments.ucsf.edu/tobacco/docs/#id=xfhd0095.
Non-Final Office Action dated Sep. 25, 2012 in U.S. Appl. No. 12/648,154.
Final Office Action dated May 9, 2013 in U.S. Appl. No. 12/648,154.
Non-Final Office Action dated Jul. 31, 2014 in U.S. Appl. No. 12/648,154.
Final Office Action dated Dec. 19, 2014 in U.S. Appl. No. 12/648,154.
Notice of Allowance dated Jun. 24, 2015 in U.S. Appl. No. 12/648,154.
Weinbreck, Fanny, "Whey protein/polysaccharide coacervates: structure and dynamics," Feb. 22, 1977, Thesis Utrecht University, The Netherlands, NIZO food research.

* cited by examiner dissolvable films impregnated with encapsulated tobacco, tea, coffee, botanicals, and flavors for oral products

CROSS-REFERENCE TO RELATED APPLICATIONS

This application is a continuation application of U.S. application Ser. No. 12/648,154 entitled DISSOLVABLE FILMS IMPREGNATED WITH ENCAPSULATED TOBACCO, TEA, COFFEE, BOTANICALS, AND FLAVORS FOR ORAL PRODUCTS, filed on Dec. 28, 2009, which claims priority under 35 U.S.C. § 119 to U.S. Provisional Application No. 61/141,557 entitled DISSOLVABLE FILMS IMPREGNATED WITH ENCAPSULATED TOBACCO, TEA, COFFEE, BOTANICALS, AND FLAVORS FOR ORAL PRODUCTS, filed Dec. 30, 2008, the entire contents of which are hereby incorporated by reference.

SUMMARY

In one embodiment, a process is provided for preparing a film of coated particles of finely-divided plant material, comprising: combining particles of finely divided plant material and a first coating material in a liquid medium, wherein the first coating material adsorbs onto at least a portion of a surface of the particles to form a layer of the first coating material; mixing a second coating material with the liquid medium, wherein the second coating material adsorbs onto at least a portion of the layer; inducing gelation to form a gel matrix comprising the particles at least partially surrounded by the layer of the first coating material and embedded in the second coating material; and forming a film from the gel matrix, wherein (i) the plant material and the first coating material are electrostatically attracted, (ii) the first coating material and the second coating material are electrostatically attracted, or (iii) both (i) and (ii).

In another embodiment, a film of coated particles of finely-divided plant material is provided, the film comprising: a gel matrix comprising particles of finely-divided plant material at least partially surrounded by a first coating material and embedded in a second coating material, wherein (i) the plant material and the first coating material are electrostatically attracted, (ii) the first coating material and the second coating material are electrostatically attracted, or (iii) both (i) and (ii).

In a particular embodiment, the finely divided particles of plant material are coated with plant-sourced proteins and/or plant-sourced polysaccharides, for example tobacco sourced pectins.

DETAILED DESCRIPTION

Figure 1:
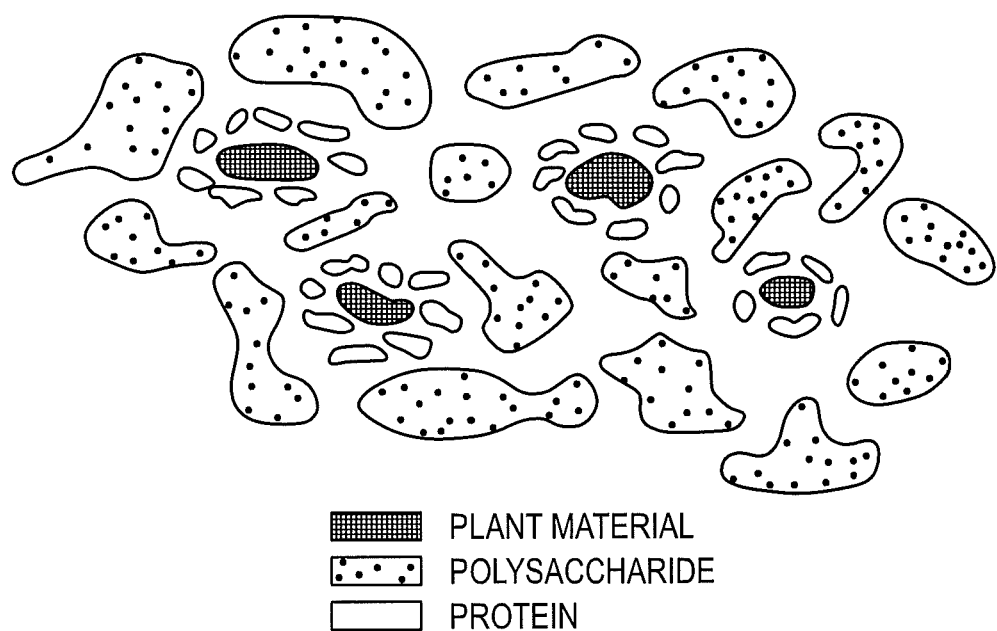
FIG. 1 is a schematic illustration of a film of coated particles as described herein.

The present application describes processes for preparing orally-enjoyable films of coated particles of plant material. In a particular embodiment, ground tobacco particles are coated with polysaccharide-protein coacervate gels and formed into films.

For increased consumer acceptability of orally utilized compositions of plant materials, the materials are coated to improve their mouth feel, taste, texture, appearance, smell, flavor and/or flavor delivery, or other attributes.

Plant materials that may be encapsulated include smokeless tobaccos, comprising chewing tobacco, snus, dry snuff, and moist snuff, as well as non-tobacco botanicals such as coffee or tea. Encapsulation to form films as described herein can offset negative flavor characteristics (such as bitterness, astringency, acridness, flavor harshness, and/or unpleasant aftertaste) of orally enjoyable products that include plant materials.

Films as described herein provide numerous advantages. Because coating materials comprising the film supply a neutral aesthetic color over the base particle of plant material (as opposed to the deep brown color of, e.g., ground tobacco particles), the films can be incorporated into products without the need for added colorants. Optionally, color may be added to the neutral base color of one or more coatings in the film. The coated particles making up the film also exhibit reduced odor compared to, e.g., uncoated tobacco particles. Additionally, a coating as described herein may provide for improved cohesion, thus aiding in the formation of a film.

Moreover, when the coated particles are in the mouth, they swell upon mixture with saliva, creating a pleasant mouthfeel, and reducing certain undesired physiological sensations, such as throat itching, that can sometimes be observed when uncoated tobacco products are used. The particles provide a mild, creamy flavor and texture that combines particularly well with other food ingredients, such as sugars, starches, polyols, oils, lipids, waxes, fats, fatty acids, glycerides, etc.

A film of coated particles as described herein advantageously provides controlled release of flavors from the plant material, while also permitting control of the time profile of flavorant release by adjustment of the integrity and thickness of the coatings, and of the gel strength. In a particular embodiment, wherein coating materials are at least partially derived from tobacco, economic efficiencies are obtained as well, since they can replace other materials that might otherwise result in greater costs.

As used herein, the term "film" denotes a relatively flat article, including a strip, a tape, a sheet, and the like.

As used herein, the term "coacervate" denotes aggregations of molecules held together via non-covalent interactions such as electrostatic, van der Waals and hydrophobic attractive forces, and the like. A specific example of a coacervate is one or more particles of plant material, such as tobacco particles, that are held to an aggregation of protein molecules (typically electrostatically charged) that form a coating on at least part of the surface of the particles and form a layer. These protein molecules in turn bind to an aggregation of polysaccharide molecules that substantially surround the layer.

As used herein, the term "particle" denotes a relatively small, subdivided unit of material, which may be in one or more of a variety of regular or irregular shapes. The term is intended to include powders, granules, shreds, and elongated structures, such as whiskers, fibers, and the like. The term is also intended to include droplets of liquid or gel, e.g., droplets of liquid plant extract, as well as solids.

As used herein, the terms "colloidal" and "colloid" refer to a system in which finely divided particles, which are approximately 10 to 10,000 angstroms in size, are dispersed within a continuous medium in a manner that prevents them from being filtered easily or settled rapidly.

As used herein, the term "finely divided" denotes particles which possess an average size of about 3000 μm or less. To "finely divide" a material denotes processing by comminution, pulverization, grinding, micronization, cutting, shredding, and the like, to produce a finely divided material.

As used herein, the term "orally enjoyable" denotes the ability of a material or product to be enjoyed and at least partially consumed via the mouth.

As used herein, the term "about" when used in conjunction with a stated numerical value or range denotes somewhat more or somewhat less than the stated value or range, to within a range of ±10% of that stated.

Plant Material Particles

Any plant or botanical material typically consumed by humans or animals can be coated by the methods described herein. Particularly suitable plant materials include tobacco and tobacco substitutes. The plant materials are generally in particulate form, and are preferably under 3 mm in size, more preferably under 1000 microns in size. The term "micronized" as used herein means reduced to an average size of no larger than about 250 microns.

Suitable particles of plant material may include, or be derived from, any part of a plant, such as leaf, stem, flower, fruit, nut, bean, bark, root, and the like. The term "derived from," as used herein, is intended to include any materials obtained by processing plant part(s) itself, such as extract fractions of a plant (e.g., an extract of a tobacco plant) or parts thereof. The plant material may be ground, shredded, or otherwise processed to obtain particles from larger pieces of plant material. The particles may be in any suitable form including, but not limited to, shreds, granules and powders, and can have any desired shape, such as different regular and irregular shapes. Suitable regular shapes may include round, square, rectangular, oval, other polygonal shapes, cylindrical, fibrous, and the like.

In one embodiment, the particles of plant material take the form of finely-divided powders, such as tobacco powders. Preferably, the particles can have a diameter less than about 3 mm, and more preferably less than about 1000 microns, and even more preferably, between about 0.2 microns and about 250 microns, and most preferably, between about 1 micron and about 100 microns. In a further embodiment, the particles can include ground or micronized particles of a size so that they can form a colloidal suspension of particles in a liquid medium, more particularly in an aqueous medium, such as water. In forming the coating as described below, the particles can be added in the form of a powder or as a colloidal dispersion.

In a particular embodiment, the particles of plant material can be electrostatically charged, Zwitterionic, or neutral. Electrostatically charged particles can more easily attract and hold one or more proteins to form a coacervate. If the finely divided plant material does not have the desired innate charge for attracting the protein coating material, the particles may be treated to alter the charge thereof before being mixed with the protein coating material, as described in more detail herein. In a particular embodiment, the particles desirably have a negative overall electrostatic charge. Ground tobacco particles generally have a net negative electrostatic charge if untreated.

First Coating

The first coating material may be selected from the group consisting of proteins (which includes protein hydrolyzates), cationic polysaccharides or oligosaccharides, non-ionic polysaccharides, or oligosaccharides, and mixtures of them.

It is desirable to select a first coating material that has a charge that will be attracted to the charge possessed by the divided plant material.

In one aspect there is provided a coated particle of plant material which comprises a base particle of finely-divided plant material which can be charged or neutral, a first coating material coating at least a portion of, and preferably all of, the base particle and a second coating material disposed at least partially on said first coating material. The first coating material can be neutral, Zwitterionic, or ionic, preferably cationic. The first coating material is preferably selected from the group consisting of proteins (including protein hydrolyzates), cationic polysaccharides, cationic oligosaccharides, non-ionic polysaccharides, non-ionic oligosaccharides, and mixtures of them. The second coating material can also be ionic, Zwitterionic, or neutral.

The first coating material may comprise (i) a protein or protein hydrolyzate, especially a zwitterionic or cationic protein in the case where the plant material is negatively charged; (ii) a cationic polysaccharide (especially when the plant material is negatively charged), preferably a cationic polysaccharide selected from the group consisting of chitosan, quaternary cellulosic polymers, modified cationic polysaccharides, polyquat-4, amidated pectins, and amidated or cationically modified starches; or (iii) non-ionic polysaccharide, a polyvinyl pyrrolidone, a poly vinyl alcohol, or combinations thereof. If the first coating material is a non-ionic polysaccharide, it may be selected from the group consisting of modified starches, or methyl cellulose and derivatives thereof, including hydroxyl propyl methyl cellulose, propylene glycol ester of alginic acid, agar, curdlan, and modified pectins, such as those of citrus, apple, plum, gooseberry, or tobacco plant origin. Combinations of two or more of these materials may be used.

If the first coating material is a protein, it may be a plant-based or animal-based protein, and preferably is, or is derived from, a milk protein, a fish gelatin, a whey protein, an egg white protein, a rice protein, a soy protein, a wheat protein, a tobacco protein or a protein fraction from a tobacco plant, a protein from or derived from tobacco extract, or combinations thereof, a gelatin other than fish gelatin, corn protein, or protein hydrolyzates. The protein may contain a high content of amino acid groups with a nitrogen-containing (preferably non-cyclic) side chain, such as lysine, asparagine, glutamine, and arginine, which are beneficial for crosslinking with carbohydrate carboxylic groups under processing conditions. Gelatins other than fish gelatin include beef gelatin, pork gelatin, and gelatin hydrolyzates. Fish gelatin, for example, can be produced by comminution of the minced flesh of any of several species of lean fish, e.g., haddock, cod, cusk, cat and ocean perch. During comminution a small amount of sodium chloride may be added to improve the texture of the finished fish gelatin product.

In a particular embodiment, the protein desirably has a molecular weight ranging between about 2 kDa and about 1000 kDa, and preferably between about 15 kDa and about 500 kDa.

The protein coating material can have an overall electrostatic charge, or can be zwitterionic or neutral. It is desirable to select a protein coating material that has an electrostatic charge opposite a charge possessed by the particles of plant material. Charges on the protein can facilitate electrostatic complexation between the protein-coated particle and a subsequent polysaccharide coating, thereby helping to form the coacervate. In one embodiment, the protein coating material can be zwitterionic or cationic in the case where the tobacco material has an overall negative electrostatic charge. The electrostatic charge on the protein can be modified by placing the protein in an aqueous solution, and adjusting the pH of the solution until the desired charge is obtained. The pH adjustment necessary and the resulting electrostatic charge obtained depend, to some extent, on the pKa of the protein side chains. For example, acidifying the protein solution (so that pH<pKa of the acidic and basic side chains) will generally place a net positive electrostatic charge on the protein, while making the protein solution more alkaline (pH>pKa of the acidic and basic side chains) will generally result in proteins having a net negative electrostatic charge.

If an allergen-free product is desired, it is preferred to employ protein derived from fish gelatin, rice protein, oat protein, or corn protein, or their hydrolyzates. It is preferable that the proteins be relatively pure and not treated or "instantized" with surfactants. It may also be preferable to treat the protein or protein hydrolyzate coating with an acid to impart a positive charge to facilitate electrostatic complexation between the protein and a subsequent coating comprising a polysaccharide/oligosaccharide.

The first coating material may have a molecular weight between about 2 kDa and about 1000 kDa, or preferably between about 15 kDa and about 500 kDa.

Second Coating

The second coating material is adsorbed over at least a portion of, and preferably all of, the first coating. As a result, a gel matrix can be obtained comprising the plant particles at least partially surrounded by the layer of the first coating material, and embedded in the second coating material. Here, "embedded in" means that the second coating material substantially surrounds the layer of first coating material which is around the plant particle. The second coating may be thought of as a continuous phase of the gel matrix.

The second coating material may be ionic, zwitterionic or neutral. More particularly, the second coating material preferably comprises an anionic, zwitterionic or neutral polysaccharide, a protein (including protein hydrolyzates), a mixture of polysaccharides, or a mixture of one or more polysaccharides and one or more proteins. The second coating material may have a molecular weight between about 5 kDa and about 1,000 kDa, preferably between about 100 kDa and about 500 kDa, more preferably between about 200 kDa and about 500 kDa.

If the second coating material is an anionic or zwitterionic polysaccharide, it is preferably selected from at least one of carrageenan, gum Arabic, carboxymethyl cellulose, pectins, such as those from citrus, apple, plum, gooseberry or tobacco plant origin, sodium alginate, gum tragacanth, locust bean gum, gellan gum, and xanthan gum.

If the second coating is a nonionic polysaccharide, it is preferably selected from the group consisting of modified starches, methyl cellulose and derivatives thereof, hydroxy propyl methyl cellulose, propylene glycol ester of alginic acid, agar, curdlan, and modified pectins of citrus, apple, plum, gooseberry, or tobacco plant origin (where the pectins have been modified to be non-ionic).

If the second coating is a protein, it may be either plant or animal based, and is preferably derived from milk protein, whey protein, egg white protein, soy protein, rice protein, wheat protein, tobacco protein fractions from tobacco plants or tobacco extracts, fish gelatin, gelatin other than fish gelatin, corn protein, or protein hydrolyzates. If it is desired to provide allergen-free products, the protein may be derived from rice, fish gelatin, oat protein, corn protein, or their hydrolyzates. The protein preferably has a net negative or neutral charge under solution pH.

A polysaccharide having a net negative electrostatic charge is desirable because it forms a stable coacervate with a positively charged protein layer. If desired, the charge on the polysaccharide can be manipulated by, e.g., adjusting the pH of a liquid medium containing the polysaccharide.

The polysaccharide to be used as a coating is preferably non-standardized (i.e., supplied in a form without additives) and substantially free of salts, sugars, and hemicelluloses (e.g., compounds with a molecular weight of between about 1 kDa to about 5 kDa). In a particular embodiment, suitable polysaccharides preferably have a molecular weight ranging between about 5 kDa and about 1,000 kDa, more preferably between about 100 kDa and about 500 kDa, and most preferably, between about 200 kDa and about 500 kDa.

Preferably, at least one of the polysaccharides or proteins in the second coating can form a gel in the pH range of about 3 to about 9. Alternatively, or in addition, it is preferred that the second coating material further comprises one or more monovalent, divalent, or trivalent cations such as potassium, calcium, magnesium, and iron, in the form of salts such as chloride, citrate, lactate or acetate salts, which may assist in forming salt bridges between the coating materials, particularly when the second coating material includes an anionic or neutral polysaccharide, a protein, a mixture of polysaccharides, or a mixture of polysaccharide and protein. Alternatively, or in addition, the proteins and polysaccharides of the second coating can gel as a result of crosslinking, hydrogen bonding, hydrophobic interactions, or electrostatic complexation, particularly among carboxylic groups of polysaccharides and amino groups of proteins, or vice versa.

If desired, the protein or protein hydrolyzate of the second coating material can be converted to a positive charge to facilitate electrostatic complexation between the protein and the polysaccharide/oligosaccharide. The conversion of the protein to a relatively positive state may be affected by lowering the pH of the liquid medium with weak food grade organic acids such as acetic, adipic, fumaric, malic, lactic, tartaric, and/or gluconic acids, gluco delta lactone, and/or food grade inorganic acids such as strong hydrochloric acid.

Control of the kinetics of extraction can be exercised by manipulating the gel strength of the second coating. Gel strength can be controlled by, e.g., controlling the molecular weight, polydispersity, degree of esterification, degree of pectin amidation (in particular, the degree of amidation of tobacco-derived pectins), combining pectins with carageenans, and/or by manipulating the processing of the coated particles, and in particular, the order of addition of polysaccharides and/or proteins.

Coating the Particle and Gelation

One embodiment includes a method for preparing coated particles of finely-divided plant material, comprising combining in a liquid medium particles of plant material and a first coating material, wherein the first coating material adsorbs onto at least a portion of a surface of the particles to form a layer, and mixing a second coating material with the liquid medium, wherein the second coating material adsorbs onto at least a portion of the layer. Subsequently, as described below, the mixture is gelled and a film of encapsulated plant material formed.

In a particular embodiment of this method, the combining comprises adding either the particles of plant material, or a colloidal dispersion of the particles of divided plant material in a dispersing medium, to a dispersion of the first coating material in the first liquid medium. The dispersing medium is preferably an aqueous medium, such as deionized water.

The formation of the coatings typically involves the gelling of the first and/or second coating material. This may be accomplished by, e.g., adjusting the pH of the coating material or the surrounding liquid medium or both, adjusting the temperature of the coating material or the surrounding liquid medium or both, introducing gelation agents, or a combination of these. Different methods may be used to gel each coating material.

The particles of plant material are typically naturally negatively-charged, and thus disposed to electrostatically attract a positively-charged first coating material (e.g., a protein). However, if the particles are not negatively-charged as obtained, they may be treated with appropriate reagents to impart a negative charge to the particles before they are mixed with the first coating. For example, particles may be treated with an appropriate amount of one or more bases such as sodium carbonate, sodium bicarbonate, and/or sodium hydroxide (such as lye), to impart a negative charge to at least some of the particle surfaces.

The suitably micronized plant material can be dispersed in a dispersing medium, preferably an aqueous medium (e.g., deionized water), to form a colloidal dispersion of the plant material. The plant material dispersed in the dispersing medium can be added to a solution of the first coating material in the liquid medium to form a coated particle dispersed in the liquid medium. Alternatively, the micronized plant material can be added directly to the first coating material in the liquid medium to form the coated plant material dispersed in the liquid medium.

The pH of either the dispersed plant material or the first coating material can be altered relative to the liquid medium, e.g., by adjusting the pH of the liquid medium as desired to facilitate the electrostatic coating of the plant material. Suitable substances for adjusting the pH include food-grade materials such as weak organic acids, e.g., acetic acid, adipic acid, fumaric acid, malic acid, lactic acid, tartaric acid, or gluconic acid, or mixtures of these, or glucono delta lactone, or strong food grade hydrochloric acid. Alternately, the pH may be manipulated by adding bases such as sodium carbonate, sodium bicarbonate or sodium hydroxide, or mixtures of these, for example.

Desirably, the surface of the uncoated particles attracts the first coating material, for example via electrostatic attraction. The first coating material deposits onto at least a portion of a surface of the particles, thereby forming a layer of the coating material. Preferably, the first coating material forms a layer substantially covering the entire surface of at least some of the particles, and desirably of the majority, or substantially all, of the particles. The thickness of this layer may be uniform or non-uniform.

The plant material coated with the first coating material is then contacted with a solution of a second coating material. Prior to adding the second coating material to the mixture containing the once-coated plant material, or before the once-coated plant material is added to the second coating material, the overall electrical charge of the first coating on the plant material can be altered by adjusting the pH of the liquid medium. Suitable substances for adjusting the pH are acids and bases, e.g., weak organic acids such as acetic acid, adipic acid, fumaric acid, malic acid, lactic acid, tartaric acid, gluconic acids, and glucono delta lactone, or strong food grade hydrochloric acid, or bases such as sodium carbonate, sodium bicarbonate, or sodium hydroxide, for example. In one aspect, a layer of the first coating material (e.g., a protein or protein hydrolyzate) can be treated with an acid to facilitate electrostatic attraction of the second coating material.

The two coating materials may be mixed simultaneously with the plant material. For example, a polysaccharide composition may be mixed with a protein and with uncoated particles in the form of a suspension or solution. Because of the coacervation mechanism (e.g., respective electrostatic attractions and repulsions), the first coating material can deposit onto at least a portion of the surface of the particles and the second coating material can attach onto at least a portion of the outside surface of the layer.

The twice-coated plant material may be additionally coated with one or more of the substances (which may optionally added along with the first and/or second coating, or applied subsequently), with or without additional additives. The additional additives that may be employed to adjust the physiological characteristics of the final product. For example, sweeteners like xylitol or solid sweeteners and solid flavors (encapsulated) can be added. Other food ingredients such as starches, polyols, oils, lipids, waxes, fats, fatty acids, glycerides, and the like may be added to achieve desirable characteristics in the final product.

In any of the embodiments described herein, the thickness of the layer of the first coating material may be uniform or non-uniform. The relative amounts of plant particles and first and second coating materials, as well as the types of each, may be adjusted to provide more or less plant material and to control the properties of the resulting film, for example flexibility, strength, organoleptic attributes, etc.

A polysaccharide optionally contains at least one pectin. A pectin can form a complex coacervate with a protein as a result of hydrophobic interactions and/or electrostatic complexation, in the presence or in the absence of a salt, which can help to crosslink the pectin, forming the pectin coating into a gel.

Alternatively, or in addition, first coating material and/or the second coating material can gel as a result of hydrogen bonding, hydrophobic interactions, electrostatic interactions, formation of salt bridges (e.g., monovalent, divalent, or trivalent cation-induced crosslinking resulting from the addition of, e.g., potassium, calcium, magnesium, and/or iron salts of chloride, citrate, lactate, acetates, and/or other counterions), van der Waals interactions under room temperature or below, or during hot processing conditions, or some combination of these.

Gelation may be induced by various methods, such as adjusting the pH of the liquid medium containing the particles; adding monovalent, divalent or trivalent cations to the liquid medium containing the particles (which may be uncoated, coated with protein, or coated with protein and polysaccharide at the time of addition); heating the particles to a temperature of between about 60° C. and about 90° C. for about 1 to about 3 hours; cooling the particles to a temperature of between about 20° C. and about 0° C. for about 1 to about 48 hours; removing at least part of the liquid medium from the coated particles by drying, e.g., by air drying, freeze drying, using reduced atmospheric pressure, or combinations of these procedures.

In a particular embodiment, a salt may be added or included at least in part to further assist in formation and gelation of a coacervate from the first and second coating materials. Examples of suitable salts may include, but are not limited to, monovalent, divalent, or trivalent cations such as potassium, calcium, magnesium and iron, in the form of salts such as chloride, citrate, lactate or acetate salts. These salts may be used individually or in combination. In a particular embodiment, a divalent salt, such as salts of calcium and magnesium, can be introduced during or after the addition of a polysaccharide composition to the particles. The resulting coated particle may have a net negative or neutral charge.

However, it has been found that the addition of such a salt is not necessary in order for gel formation to occur when a polysaccharide such as pectin is added to a protein layer. More specifically, gel formation is facilitated by specific interactions, believed to be between carboxylic groups of a polysaccharide and amino groups of proteins (or between amino groups of the polysaccharide and carboxylic groups of the proteins). This is particularly true under processing conditions of 60-90° C. for 1-3 hours. The result of these interactions is that a polysaccharide-protein coacervate (and in particular, a pectin-protein coacervate) may gel without the addition of divalent metal cations, which have been expected to be necessary for pectin gelation. These interactions allow the gel strength of a pectin-protein coacervate to be modified and controlled by, e.g., varying the number of available carboxylic groups and/or amine groups of the pectin, depending upon the number of carboxyl groups or amine groups in the protein able to interact with them. This can be done by amidation or deamidation of carboxyl groups of the pectin, which can convert carboxyl groups to carboxamides, or the converse, respectively.

In a preferred embodiment, at least one polysaccharide can form a gel in the pH range between about 3 and about 9. Alternatively, or in addition, at least one polysaccharide can form a gel upon addition of monovalent, divalent or trivalent cations to the liquid medium during or after addition of the polysaccharide. Cations can be selected from the group consisting of potassium, calcium, magnesium and iron, and can be introduced as chloride, citrate, lactate, and acetate salts that are added to the liquid medium during or after addition of the polysaccharide coating material to induce formation of the gel, e.g., via formation of salt bridges. As described herein, gelation may also be induced or aided by heating (e.g., to a temperature between about 60° C. and about 90° C., and preferably, between about 60° C. and about 80° C., for about 10 to about 180 minutes, and preferably, for about 60 to about 90 minutes). In particular, the use of commercially available pectins, at least in part, can reduce or eliminate the need for the addition of a salt, since such commercial pectins tend to gel immediately upon heating.

In a further embodiment, inducing gelation requires no active steps beyond mixing the desired components and allowing them to react for a period of time.

The process of forming the coacervate coating, or steps thereof, may be repeated, if desired, by using the same or different coating materials as those described for the protein and polysaccharide coating materials, with or without the above-mentioned additional components or additives. A series of layers can therefore be built up around the base particle of plant material, each of which may be the same or different from other layers, and which may provide desirable properties to the user, such as varying flavor or chemesthetic effect, or further extension of flavor duration, as the successive layers of the coating come into contact with saliva.

By using the methods disclosed herein, the strength of the coating of the particles of plant materials described herein, and thus, the coating efficiency, can be controlled to achieve the desired release kinetics for the plant material. In a particular embodiment, at least one polysaccharide in the second coating can form a gel in the pH range of about 3 to about 9. In this embodiment, additional gel formation in the second coating layer may further improve the coating strength. For instance, κ-carrageenan can form a relatively strong and rigid gel under similar pH conditions, and may be included in a polysaccharide coating material. The amount of κ-carrageenan, which is preferably incorporated in the coated particles in the range of about 10% to about 60% by weight, based on the total weight of the polysaccharides in the coated particles.

The strength of the gel matrix surrounding the particles may be manipulated by modifying the above-described coating process. In particular, the second coating material may be preferentially optimized in terms of the swelling behavior and visco-elasticity under physiological pH and temperature conditions, for controlling the extraction kinetics of materials from the film.

In one embodiment of a method for making the film of coated particles of plant material described herein, a protein is added to particles of plant material in a liquid medium, forming a layer thereon. This layer can form on at least on a portion of a surface of the particles, and preferably substantially cover the entirely surface of the particles. Thereafter, a pectin can be added to the protein-coated particles obtained in the first step. The added pectin can be adsorbed onto at least a portion of, and preferably all of, the surface of the first layer. At this stage, the pectin in the second coating may interact with the protein in the first coating layer, thereby forming a coacervate.

As an extension of the above embodiment, κ-carrageenan can be added to the liquid medium and adsorb onto at least a portion of a surface of the pectin, which in this instance forms a second coating layer. Preferably, the κ-carrageenan substantially covers the entire surfaces of the second coating layer. Then, κ-carrageenan may form a gel under appropriate condition, resulting in a gel matrix comprising the plant material with a first coating of protein and a second coating of pectin, embedded in the κ-carrageenan.

After formation, a gel matrix as described herein may desirably be stabilized by cooling or maintaining it at a temperature below the temperature of gel formation, and preferably below room temperature, but above the freezing point of the gel, and typically between about 20° C. and about 0° C., and preferably, between about 15° C. and about 5° C., for about 1 to about 60 hours, and preferably, about 12 to about 48 hours. Such stabilization may be performed before or after forming the film, or concurrently therewith.

Forming the Film

Following gelation, at least two different methods may be used to form the film of encapsulated botanicals. In one embodiment, a complex coacervate is formed into a relatively solid gel matrix, which is then cut along one or more sides into a desired geometry, followed by drying (e.g., at room temperature or freeze drying). Alternately, a complex coacervate matrix can be squeezed and flattened (e.g., by passing it through rollers or by using a press) to provide a desired thickness, and optionally cut to desired lengths and/or widths, with drying occurring before and/or after this flattening. In each case, it may be beneficial to have an excess of the second polymeric coating, which forms a gel matrix around the first layer preferably substantially surrounding each particle of plant material. Additionally, an extrusion step may be used in the film-formation process.

The film may be formed so to have a textured surface, and/or perforations. The film may also be cut after it is formed, either before or after optional drying.

If rollers are used to form the film, the rollers are optionally heated rollers. The rollers may be smooth, or may be textured in order to provide the above-mentioned texture and/or perforations to the film.

In a particular embodiment, the film of coated particles can desirably be dried to a moisture content of less than about 15%, preferably, about 2% to about 10%, and more preferably, about 2% to about 6%. Preferably, the drying is at room temperature or is freeze drying. Optionally, the drying is conducted under less than one atmosphere of pressure.

The film may have nearly any desired dimensions. Preferably, the film has a size and strength so as to be self-supporting, meaning that it can withstand normal handling while remaining intact. Also preferably, the film should be somewhat flexible. In an embodiment, the film received a further coating after it is prepared.

The resulting films provide controlled release of the ingredients, and, by using different source materials prior to film formation, can include patchworks of differing composition for different release profiles, ingredients, and the like, in a single film.

The film may be used itself as an orally enjoyable product, or may be incorporated into another product, such as a palatable or comestible product. For example, the film may be used on the inside or outside of an orally-enjoyed product, such as a pouched tobacco product.

Representative Compositions

In certain embodiments, the final composition of the film may contain about 10% to about 90% of plant material, more particularly about 20% to about 80%, and still more particularly, about 40% to about 70% plant material. The first layer may comprise an amount of the coated particle ranging from about 1% to about 20%, more particularly about 1% to about 30%, even more particularly about 5% to about 15%. The second coating may comprise an amount of the coated particle ranging from about 1% to about 60%, more particularly about 5% to about 50%, even more particularly about 15% to about 40%. Each of these percentages is provided as a percentage by weight based upon the dry weight of the film.

It may also be advantageous to add some additional components or other additives during the processing to affect the "mouth feel," taste, texture, appearance, smell, flavor, flavor delivery and/or other attributes of the plant material. One or more other components may be included in the coatings, including, but not limited to, the following: gum Arabic, flavorants, colorants, sweeteners such as xylitol, bulking agents, fillers, anti-adherent compounds, dispersing agents, moisture absorbing compounds, warming agents, cooling agents and film-forming agents. Other food ingredients such as starches, polyols, oils, lipids, waxes, fats, fatty acids, glycerides etc., may be also added to the coating to enhance the mouth feel of the finished, dried product. Additives, such as physiological cooling agents, throat-soothing agents, spices, warming agents, tooth-whitening agents, breath-freshening agents, vitamins, minerals, caffeine, drugs, and other actives may be included in any or all portions of the coatings. Such components may be used in amounts sufficient to achieve their intended effects.

The second coating material may be preferentially optimized for controlling the extraction kinetics of materials from the plant material by controlling its swelling behavior and visco-elasticity under physiological pH and temperature conditions. The release of selected compounds from the plant materials may be triggered by simple diffusion into saliva, by action of enzymes in the saliva on one or more materials making up the film, and/or upon application of pressure by the tongue and teeth. For example, upon ordinary chewing or dipping of the product, the user will release flavorings or other attributes as hydration occurs.

The coacervate coatings may be stable for a limited time, e.g., from about 10 to about 20 minutes under normal exposure to saliva. The in-mouth time constant may be changed by selection of particular materials in the coatings.

Exemplary Method for Making Coated Particles.

FIG. 1 is a schematic depiction of a coated particle formed by the method described herein. In the center is a finely-divided particle of plant material, in this case tobacco, which has an overall negative charge. It is surrounded or encapsulated by a first protein coating material, in this case, calcium caseinate. The protein layer is in turn surrounded or encapsulated by a polysaccharide, in this case κ-carrageenan. Potassium ions have been added to assist in formation of the gel.

Figure 2:
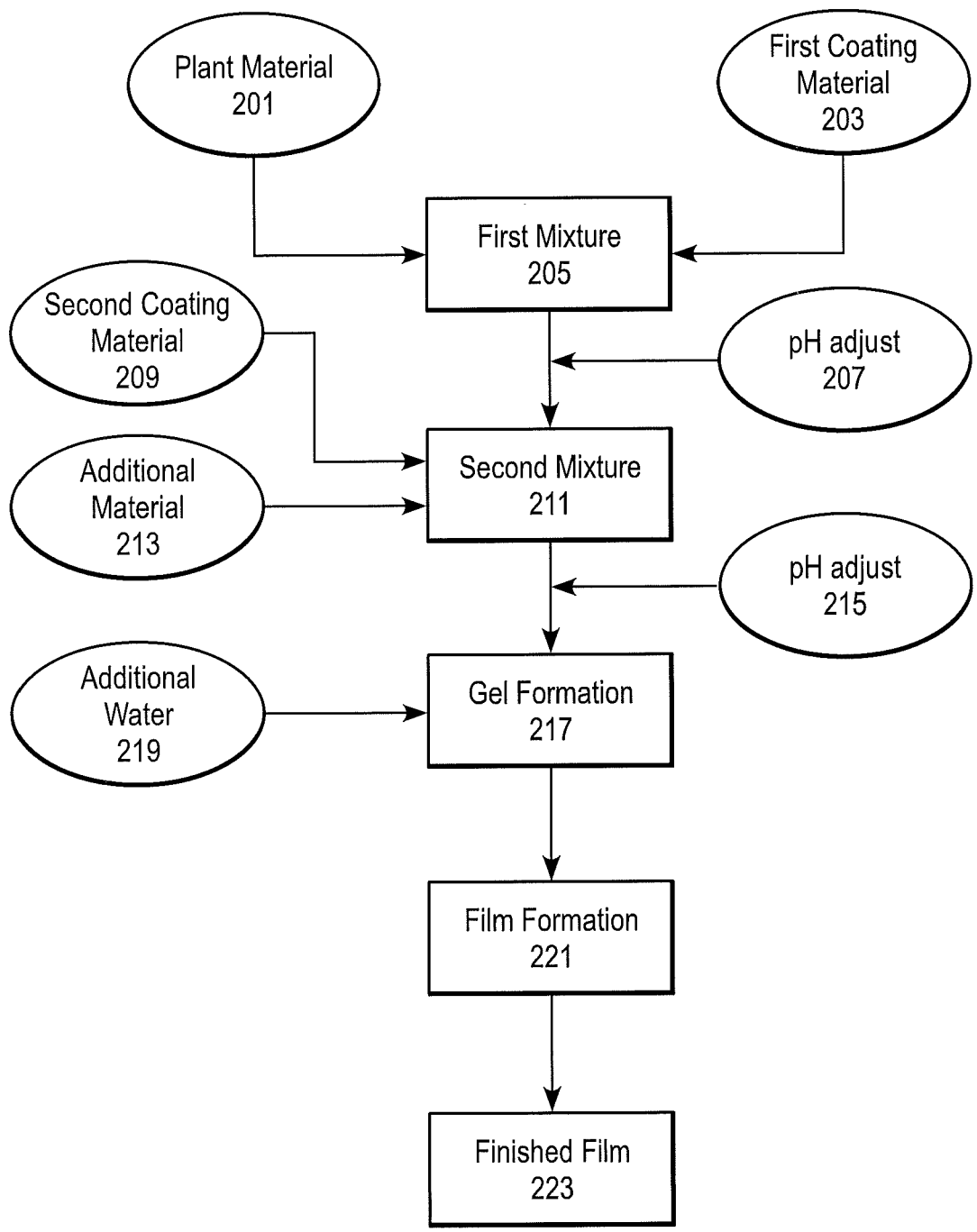
FIG. 2 is a schematic diagram of a method for preparing a film of coated particles as described herein.

FIG. 2 is a schematic depiction of one embodiment of the method of forming the coated particle. A micronized plant material 201 is combined with a first coating material 203 in a liquid medium to form a first mixture 205 of coated plant material. If needed, the first mixture 205 is treated to adjust the pH in 207 prior to the contact with the second coating material 209 to form a second mixture in 211. If desired, additional material 213 may be added to the second mixture to impart additional characteristics to the finished coated plant material, or to aid in gelation of the outer coating(s). The pH of the resulting material may be adjusted in 215 by addition of a suitable food-grade acid, base, or salt. Water may be added in 219, or removed prior to, after, or concurrently with forming the gel 217, followed by forming a film 221 from the gel of coated particles. The film may be optionally dried 223 and then utilized as is, or can be incorporated into other products.

For example, a solution containing about 0.5 to about 2% (w/w) protein in deionized water is prepared. The divided plant material is dispersed in the protein solution. The pH is adjusted to within the range from about 3.5 to about 6 with citric acid, depending on the protein used. The selected second coating material is added to the mix in a powder or solution form and mixed thoroughly. The resulting mixture is heated at about 70° C. to about 80° C. for about 1 to about 2 hours, depending on the protein used. A salt may be added to the heated mix for proper gelation of the carbohydrate. Salts are preferably added to coacervates based on carrageenan, while pectin-based coacervate gels may or may not need any added salt. Suitable salts can include KCl, calcium lactate, or a mixture of KCl and calcium lactate, depending on the type of carbohydrate used. Other salts of bivalent metals such as calcium chloride or calcium citrate (including magnesium salts) can be used as well. The coacervate gel is preferably refrigerated for about 12 to about 48 hours before being processed into a film.

In another embodiment, there is provided a method of preparing an orally-enjoyable film of coated particles of plant material which comprises dissolving a first coating material in a liquid medium and if necessary, adjusting the pH of the resulting mixture to within a first predetermined range; dispersing a colloidal plant material in the medium, either as a dry particle or in the form of a colloidal dispersion, and if necessary adjusting the pH of the resulting mixture to within a second predetermined range; dispersing a second coating material in the medium and if necessary adjusting the pH of the resulting mixture to within a third predetermined range; optionally heating the resulting mixture at a temperature of up to the boiling point of water, preferably about 60° C. to about 90° C., for about 10 minutes to about 180 minutes or more; refrigerating the mixture at a temperature of down to about the freezing point of the liquid mixture, preferably about 20° C. to about 0° C., and more preferably from about 15° C. to about 2° C. for about 1 to about 48 hours, then optionally removing excess liquid before forming a film. Additional liquid may optionally be removed following film formation.

An orally-enjoyable film as described herein is preferably stable in the mouth for about 1 to about 20 minutes. The extraction mechanics of the plant material in the mouth may be altered by altering one or more of the following characteristics of the coatings: swelling behavior, visco-elasticity under physiological pH and temperature conditions, porosity, stability or rate of diffusion of ingredients under application of pressure by tongue or teeth or both, stability from dissolution upon attack from enzymes in saliva, or combinations of these. Also, one or more of the following characteristics of the coatings can be optimized for controlling the mouth feel of the edible product: slipperiness, sliminess, firmness, sponginess, stability or rate of diffusion of ingredients under application of pressure by tongue or teeth or both, stability from dissolution upon attack from enzymes in saliva, or combinations of these. These properties can be varied by selecting various first and second coating materials, combining different coating materials, modifying the properties of coating materials, e.g., by crosslinking, or combinations of these.

EXAMPLES

Example 1

This Example provides a general method used in the subsequent Examples, wherein lowercase letters in parentheses denote the various ingredients. First, a protein (a) solution in deionized water has in it suitably divided plant material (b), and the pH of the mixture is adjusted to within the range of 3.5 to 6 by adding citric acid (c). The second coating material, such as a carbohydrate in powder or solution form (d), is added and the resulting mixture is heated at about 70° C. to about 80° C. for about 1 hour to about 2 hours to form a coacervate gel containing protein-coated plant particles. Depending on the protein used, one or more salts (e, f) such as potassium chloride and/or salts of bivalent metals such as calcium chloride, calcium citrate, calcium lactate, or magnesium salts may optionally be used. When one of the coatings is a carrageenan or alginate, it may be preferable to add a salt to allow gelation of the mixture, whereas if the gel is pectin based, addition of a salt may not be needed. Coacervate gels may or may not need any added salt. The coacervate gel is refrigerated for about 12 hours to about 48 hours to condition it before forming the film.

Example 2. Ground Tea Powder Encapsulation: Basis 100 gm of Coacervate Gel

Na-Caseinate—κ-Carrageenan Coacervate Gel Encapsulating Tea Powder.
Deionized water=89.34 gm.
(a) Na-caseinate, low fat (from American Casein company)=0.89 gm.
(b) Ball milled tea powder, average particle size 1 micron=4.47 gm.
(c) 0.5 M Citric acid solution (Sigma, 99% pure)=0-2.68 gm.
(d) κ-carrageenan (FMC Biopolymers Gelcarin 911 NF)=2.23 gm.
(e) 0.5 M KCl (ACS grade, Fisher) solution=0.18 gm.
(f) 0.153 M Calcium lactate solution (Sigma, 90%)=0.20 gm.

Example 3. Ground Coffee Powder Encapsulation: Basis 100 gm of Coacervate Gel Na-Caseinate—κ-Carrageenan Coacervate Gel Encapsulating Coffee Powder
Deionized water=89.34 gm.
(a) Na-caseinate, low fat (from American Casein company)=0.89 gm.
(b) Ball milled coffee powder, 1 micron=4.47 gm.
(c) 0.5 M Citric acid solution (Sigma, 99% pure)=2.68 gm.
(d) κ-carrageenan (FMC Biopolymers Gelcarin 911 NF)=2.23 gm.
(e) 0.5 M KCl (ACS grade, Fisher) solution=0.18 gm.
(f) 0.153 M Calcium lactate solution (Sigma, 90%)=0.20 gm.

Example 4. Tobacco Powder Encapsulation: Basis 100 gm of Coacervate Gel

Na-Caseinate—κ-Carrageenan Coacervate Gel Encapsulating Tobacco Powder
Deionized water=83.42 gm.
(a) Na-caseinate, low fat (from American Casein company)=0.83 gm.
(b) 400 mesh ground burley tobacco=5.84 gm.
(c) 0.5 M Citric acid solution (Sigma, 99% pure)=7.95 gm.
(d) κ-carrageenan (FMC Biopolymers Gelcarin 911 NF)=1.67 gm.
(e) 0.5 M KCl (ACS grade, Fisher) solution=0.14 gm.
(f) 0.153 M Calcium lactate solution (Sigma, 90%)=0.15 gm.

Example 5. Tobacco Powder Encapsulation: Basis 100 gm of Coacervate Gel

Na-Caseinate—κ-Carrageenan Coacervate Gel Encapsulating Tobacco Powder
Deionized water=86.77 gm.
(a) Na-caseinate, low fat (from American Casein company)=0.87 gm.
(b) 400 mesh ground burley tobacco=5.21 gm.
(c) 0.5 M citric acid solution (Sigma, 99% pure)=4.07 gm.
(d) κ-carrageenan (FMC Biopolymers Gelcarin 379 NF)=2.6 gm.
(e) 0.153 M Calcium lactate solution (Sigma, 90%)=0.49 gm.

Example 6. Tobacco Powder Encapsulation: Basis 100 gm of Coacervate Gel

Gelatin—Pectin Coacervate Gel Encapsulating Tobacco Powder
Deionized water=86.96 gm.
(a) Gelatin from porcine skin, type A, 300 Bloom=0.87 gm.
(b) 400 mesh ground burley tobacco=6.09 gm.
(c) 0.5 M citric acid solution (Sigma, 99% pure)=1.47 gm.
(d) Citrus peel Pectin, 40% ester (CP Kelco Genu pectin LM-18-CG)=1.74 gm.
(e) 0.153 M calcium lactate solution (Sigma, 90%)=2.87 gm.

Example 7. Tobacco Powder Encapsulation: Basis 100 gm of Coacervate Gel

Na-Caseinate—Pectin Coacervate Gel Encapsulating Tobacco Powder
Deionized water=84.78 gm.
(a) Na-caseinate, low fat (from American Casein company)=0.85 gm.
(b) 400 mesh ground burley tobacco=5.93 gm.
(c) 0.5 M citric acid solution (Sigma, 99% pure)=6.74 gm.
(d) Apple Pectin, 6% ester (Sigma)=1.70 gm

Example 8. Tobacco Powder Encapsulation: Basis 100 gm of Coacervate Gel

Na-Caseinate—Pectin Coacervate Gel Encapsulating Tobacco Powder
Deionized water=84.81 gm.
(a) Na-caseinate, low fat (from American Casein company)=0.85 gm.
(b) 400 mesh ground burley tobacco=5.94 gm.
(c) 0.5 M citric acid solution (Sigma, 99% pure)=6.71 gm.
(d) Amidated low ester pectin (Genu pectin X-916-02)=1.70 gm.

Example 9. Tobacco Powder Encapsulation: Basis 100 gm of Coacervate Gel

Chitosan—Pectin Coacervate Gel Encapsulating Tobacco Powder
Deionized water=82.03 gm.
(a) Chitosan, medium viscosity (Vanson)=0.82 gm.
(b) 400 mesh ground burley tobacco=5.74 gm.
(c) 0.5 M citric acid solution (Sigma, 99% pure)=9.61 gm.
(d) Apple Pectin, 6% ester (Sigma)=1.80 gm.

Example 10. Tobacco Powder Encapsulation: Basis 100 gm of Coacervate Gel

Soy Isolate—κ-Carrageenan Coacervate Gel Encapsulating Tobacco Powder
Deionized water=83.25 gm.
(a) Soy isolate (Solae company, Supro EX-38)=0.83 gm.
(b) 400 mesh ground burley tobacco=5.83 gm.
(c) 0.5 M citric acid solution (Sigma, 99% pure)=8.14 gm.
(d) κ-carrageenan (FMC Biopolymers Gelcarin 911 NF)=1.66 gm.
(e) 0.5 M KCl (ACS grade, Fisher) solution=0.14 gm.
(f) 0.153 M Calcium lactate solution (Sigma, 90%)=0.15 gm.

Example 11. Tobacco Powder Encapsulation: Basis 100 gm of Coacervate Gel

Soy Concentrate—κ-Carrageenan Coacervate Gel Encapsulating Tobacco Powder.
Deionized water=83.56 gm.
(a) Soy concentrate (Solae company, Alpha 10)=0.84 gm.
(b) 400 mesh ground burley tobacco=5.85 gm.
(c) 0.5 M citric acid solution (Sigma, 99% pure)=7.80 gm.
(d) κ-carrageenan (FMC Biopolymers Gelcarin 911 NF)=1.67 gm.
(e) 0.5 M KCl (ACS grade, Fisher) solution=0.14 gm.
(f) 0.153 M calcium lactate solution (Sigma, 90%)=0.15 gm.

Example 12. Tobacco Powder Encapsulation: Basis 100 gm of Coacervate Gel

Soy Isolate—Pectin Coacervate Gel Encapsulating Tobacco Powder
Deionized water=84 gm.
(a) Soy isolate (Solae company, Supro EX 38)=0.83-1.8 gm.
(b) 400 mesh ground burley tobacco=5.78 gm.
(c) 0.5 M citric acid solution (Sigma, 99% pure)=6.58 gm.
(d) Tobacco sourced pectin=1.87 gm.
(e) 0.153 M Calcium lactate solution (Sigma, 90%)=0-2.77 gm.

Example 13. Tobacco Powder Encapsulation: Basis 100 gm of Coacervate Gel

Tobacco Sourced Protein—κ-Carrageenan Coacervate Gel Encapsulating Tobacco Powder
Deionized water=87.05 gm.
(a) Tobacco sourced protein, (Philip Morris Company)=0.87 gm.
(b) 400 mesh ground burley tobacco=6.16 gm.
(c) 0.5 M citric acid solution (Sigma, 99% pure)=3.87 gm.
(d) κ-carrageenan (FMC Biopolymers Gelcarin 911 NF)=1.76 gm.
(e) 0.5 M KCl (ACS grade, Fisher) solution=0.15 gm.
(f) 0.153 M Calcium lactate solution (Sigma, 90%)=0.15 gm.

Example 14. Tobacco Powder Encapsulation: Basis 100 gm of Coacervate Gel

Tobacco Sourced Protein—Pectin Coacervate Gel Encapsulating Tobacco Powder
Deionized water=86.13 gm.
(a) Tobacco sourced protein, (Philip Morris Company)=0.86 gm.
(b) 400 mesh ground burley tobacco=6.10 gm.
(c) 0.5 M Citric acid solution (Sigma, 99% pure)=5.17 gm.
(d) 40% ester pectin (Genu pectin LM-18-CG-Z)=1.74 gm.

Example 15. Tobacco Powder Encapsulation: Basis 100 gm of Coacervate Gel

Na-Caseinate—κ-Carrageenan Coacervate Gel Encapsulating Ball Milled DBC Bright Tobacco Powder
Deionized water=83.42 gm.
(a) Na-caseinate, low fat (from American Casein company)=0.83 gm.
(b) Ball milled DBC Bright tobacco, 1 micron=5.84 gm.
(c) 0.5 M Citric acid solution (Sigma, 99% pure)=7.95 gm.
(d) κ-carrageenan (FMC Biopolymers Gelcarin 911 NF). 1.67 gm.
(e) 0.5 M KCl (ACS grade, Fisher) solution=0.14 gm.
(f) 0.153 M Calcium lactate solution (Sigma, 90%)=0.15 gm.

Example 16. Tobacco Powder Encapsulation: Basis 100 gm of Coacervate Gel

Na-Caseinate—κ-Carrageenan Coacervate Gel Encapsulating Tobacco Powder Processed Via Microfluidics Homogenizer
Deionized water=83.42 gm.
(a) Na-caseinate, low fat (from American Casein company)=0.83 gm.
(b) 400 mesh ground burley tobacco, processed via Microfluidics, ~15 micron=5.84 gm.

(c) 0.5 M Citric acid solution (Sigma, 99% pure)=7.95 gm.
(d) κ-carrageenan (FMC Biopolymers Gelcarin 911 NF)=1.67 gm.
(e) 0.5 M KCl (ACS grade, Fisher) solution=0.14 gm.
(f) 0.153 M Calcium lactate solution (Sigma, 90%)=0.15 gm.

Information regarding the extraction, deesterfication, and amidation of tobacco pectins may be found in U.S. Pat. Nos. 4,034,764; 4,143,666; 4,972,854; 4,506,684; and/or 5,724,998, each of which is incorporated herein by reference.

While various methods and products have been described herein with reference to specific embodiments, variations and modifications may be made without departing from the spirit and the scope of the appended claims. Such variations and modifications are to be considered within the purview and scope of the invention as defined by the appended claims.

What is claimed is:

1. An orally-enjoyable film of coated particles of finely-divided plant material, the film comprising:
   a gel matrix including,
      a plurality of particles of finely-divided plant material at least partially surrounded by a first coating material and embedded in a second coating material, the plant material including tobacco,
   wherein:
      (i) the plant material and the first coating material are electrostatically attracted,
      (ii) the first coating material and the second coating material are electrostatically attracted, or
      (iii) both (i) and (ii),
   wherein the film has a smooth surface, the film is flexible, and the film is mouth-stable for about 1 minute to about 20 minutes,
   wherein the film includes the first coating material in an amount of about 1% to about 20% by dry weight and the second coating material in an amount of about 5% to about 50% by dry weight, and
   wherein the film provides controlled release of the plant material.

2. The film of claim 1, wherein the plant material consists of:
   a micronized powder obtained by finely dividing a plant or a fragment of a plant and the film is an extruded film.

3. The film of claim 1, wherein:
   (i) the particles have an average largest dimension of less than about 3000 microns;
   (ii) the film comprises:
      the plant material in an amount of about 10 to about 90% by dry weight;
   (iii) the coated particles have a moisture content of less than about 15% by weight;
   (iv) the coated particles has a net negative or neutral charge;
   (v) or two or more of (i) to (iv).

4. The film of claim 1, wherein:
   (i) the first coating material comprises at least one protein, the at least one protein including milk protein, whey protein, soy protein, wheat protein, rice protein, egg white protein, protein obtained from tobacco, gelatin, protein hydrolyzates, or any combination thereof;
   (ii) the first coating material comprises a zwitterionic or positively charged protein;
   (iii) the second coating comprises at least one pectin obtained from tobacco, apples, citrus peel, plums, gooseberries, or any combination thereof;
   (iv) the second coating comprises an anionic polysaccharide;
   (v) the second coating comprises at least one material including carrageenans, gum Arabic, carboxymethyl cellulose, sodium alginates, gum tragacanth, locust bean gum, gellan gum, xanthan gum, or any combination thereof;
   (vi) the plant material further comprises a tobacco substitute, coffee, or tea;
   (vii) the film is self-supporting;
   (viii) the film comprises two or more matrices of different compositions;
   (ix) the film comprises a flavorant; or
   (x) two or more of (i) through (ix).

5. The film of claim 1, wherein the plant material further comprises a tobacco substitute.

6. The film of claim 1, wherein,
   (i) the first coating material includes proteins, cationic polysaccharides or oligosaccharides, non-ionic polysaccharides, oligosaccharides, or any combination thereof;
   (ii) the second coating material includes anionic, zwitterionic, or neutral polysaccharides; a protein; or any combination thereof; or
   (iii) (i) and (ii).

7. The film of claim 6, wherein the first coating material is a protein and the second coating material is a polysaccharide.

8. The film of claim 7, wherein the protein has a molecular weight of between about 2 kDa and about 1000 kDa and the polysaccharide has a molecular weight of between about 5 kDa and about 1000 kDa.

9. The film of claim 1, wherein the film includes areas having differing compositions so as to provide different release profiles.

10. A palatable or comestible product comprising at least one film according to claim 1.

11. An orally-enjoyable film of coated particles of finely-divided plant material, the film comprising:
   a gel matrix including,
      a plurality of particles of finely-divided plant material at least partially surrounded by a first coating material and embedded in a second coating material, which has been gelled, the plant material including tobacco,
   wherein:
      (i) the plant material and the first coating material are electrostatically attracted,
      (ii) the first coating material and the second coating material are electrostatically attracted, or
      (iii) both (i) and (ii),
   wherein the film has a textured surface, the film is flexible, and the film is mouth-stable for about 1 minute to about 20 minutes,
   wherein the film includes the first coating material in an amount of about 1% to about 20% by dry weight and the second coating material in an amount of about 5% to about 50% by dry weight, and
   wherein the film provides controlled release of the plant material.

12. The film of claim 11, wherein the plant material consists of:
   a micronized powder obtained by finely dividing a plant or a fragment of a plant and the film is an extruded film.

13. The film of claim 11, wherein:
(i) the particles have an average largest dimension of less than about 3000 microns;
(ii) the film comprises:
the plant material in an amount of about 10 to about 90% by dry weight;
(iii) the coated particles have a moisture content of less than about 15% by weight;
(iv) the coated particles have a net negative or neutral charge;
(v) or two or more of (i) to (iv).

14. The film of claim 11, wherein:
(i) the first coating material comprises at least one protein including milk protein, whey protein, soy protein, wheat protein, rice protein, egg white protein, protein obtained from tobacco, gelatin, protein hydrolyzates, or any combination thereof;
(ii) the first coating material comprises a zwitterionic or positively charged protein;
(iii) the second coating comprises at least one pectin obtained from tobacco, apples, citrus peel, plums, gooseberries, or any combination thereof;
(iv) the second coating comprises an anionic polysaccharide;
(v) the second coating comprises at least one material including carrageenans, gum Arabic, carboxymethyl cellulose, sodium alginates, gum tragacanth, locust bean gum, gellan gum, xanthan gum, or any combination thereof;
(vi) the plant material further comprises a tobacco substitute, coffee, or tea;
(vii) the film is self-supporting;
(viii) the film comprises two or more matrices of different compositions; or
(ix) the film comprises a flavorant; or
(x) two or more of (i) through (ix).

15. The film of claim 11, wherein the plant material further comprises a tobacco substitute.

16. The film of claim 11, wherein,
(i) the first coating material includes proteins, cationic polysaccharides or oligosaccharides, non-ionic polysaccharides, oligosaccharides, or any combination thereof;
(ii) the second coating material includes anionic, zwitterionic, or neutral polysaccharides; a protein; or any combination thereof; or
(iii) (i) and (ii).

17. The film of claim 16, wherein the first coating material is a protein and the second coating material is a polysaccharide.

18. The film of claim 17, wherein the protein has a molecular weight of between about 2 kDa and about 1000 kDa and the polysaccharide has a molecular weight of between about 5 kDa and about 1000 kDa.

19. The film of claim 11, wherein the film includes areas having differing compositions so as to provide different release profiles.

20. A palatable or comestible product comprising at least one film according to claim 11.

* * * * *